United States Patent
Hong et al.

(10) Patent No.: US 11,252,675 B2
(45) Date of Patent: Feb. 15, 2022

(54) METHOD FOR TRANSMITTING SIDELINK SIGNALS THROUGH PLURALITY OF CARRIERS IN WIRELESS COMMUNICATION SYSTEM

(71) Applicant: LG ELECTRONICS INC., Seoul (KR)

(72) Inventors: Uihyun Hong, Seoul (KR); Seungmin Lee, Seoul (KR); Hanbyul Seo, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 17/051,256

(22) PCT Filed: May 3, 2019

(86) PCT No.: PCT/KR2019/005350
§ 371 (c)(1),
(2) Date: Oct. 28, 2020

(87) PCT Pub. No.: WO2019/212298
PCT Pub. Date: Nov. 7, 2019

(65) Prior Publication Data
US 2021/0243701 A1    Aug. 5, 2021

Related U.S. Application Data

(60) Provisional application No. 62/666,641, filed on May 3, 2018.

(51) Int. Cl.
*H04W 52/28* (2009.01)
*H04W 52/34* (2009.01)
(Continued)

(52) U.S. Cl.
CPC .......... *H04W 52/28* (2013.01); *H04W 52/34* (2013.01); *H04W 52/38* (2013.01); *H04W 72/1205* (2013.01)

(58) Field of Classification Search
CPC .. H04W 52/28; H04W 52/34; H04W 72/1205
(Continued)

(56) References Cited

U.S. PATENT DOCUMENTS

| 2018/0007726 A1* | 1/2018 | Li ........................ H04W 76/10 |
| 2019/0045465 A1* | 2/2019 | Lee .................... H04W 56/001 |

(Continued)

FOREIGN PATENT DOCUMENTS

| KR | 1020170107505 A | 9/2017 |
| KR | 1020170121263 A | 11/2017 |

(Continued)

OTHER PUBLICATIONS

LG Electronics Inc, "V2X sidelink transmission procedure considering packet duplication", 3GPP TSG-RAN2#101bis, Apr. 16-20, 2018, R2-1806025.

*Primary Examiner* — John J Lee
(74) *Attorney, Agent, or Firm* — Dentons US LLP

(57) ABSTRACT

Provided is a method for a terminal to transmit sidelink signals in a wireless communication system according to one embodiment of the present invention, comprising the steps of: determining transmission power of a sidelink packet in each of a plurality of carriers; and on the basis of the determined transmission power, transmitting the sidelink signals through one or more carriers of the plurality of the carriers, wherein the transmission power is determined on the basis of a priority of the sidelink packet scheduled for transmission on each of the plurality of carriers, a sum of the transmission power of the sidelink packet scheduled for transmission on each of the plurality of carriers, and maximum transmission power of the terminal. The UE is capable of communicating with at least one of another UE, a UE related to an autonomous driving vehicle, the BS or a network.

14 Claims, 11 Drawing Sheets

(51) Int. Cl.
*H04W 52/38* (2009.01)
*H04W 72/12* (2009.01)

(58) Field of Classification Search
USPC .................. 455/522, 69, 452.1, 509, 512
See application file for complete search history.

(56) References Cited

U.S. PATENT DOCUMENTS

2020/0015230 A1* 1/2020 Chae .................. H04L 27/2602
2021/0051653 A1* 2/2021 Park ........................ H04W 8/22

FOREIGN PATENT DOCUMENTS

WO      2015170934 A1    11/2015
WO      2017070957 A1     5/2017

\* cited by examiner (a) DMRS location for Rel. 12/13 PSBCH (b) DMRS location for V2V PSBCH (a)

(b)

(a)

(b)

METHOD FOR TRANSMITTING SIDELINK SIGNALS THROUGH PLURALITY OF CARRIERS IN WIRELESS COMMUNICATION SYSTEM

This application is a National Stage Entry of International Application No. PCT/KR2019/005350 filed May 3, 2019, which claims the benefit of U.S. Provisional Application No. 62/666,641 filed May 3, 2018, all of which are hereby incorporated by reference in their entirety for all purposes as if fully set forth herein.

TECHNICAL FIELD

The present disclosure relates to a wireless communication system and, more particularly, to a method and apparatus for transmitting a sidelink signal on a plurality of carriers through transmission power adjustment.

BACKGROUND ART

Wireless communication systems have been widely deployed to provide various types of communication services such as voice or data. In general, a wireless communication system refers to a multiple access system capable of supporting communication between multiple users by sharing available system resources (bandwidth, transmission power, etc.). For example, multiple access systems include a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA)

Device-to-device (D2D) communication refers to a communication scheme in which a direct link is established between user equipments (UEs) and the UEs exchange voice and data directly without intervention from an evolved Node B (eNB). The D2D communication may include UE-to-UE communication, peer-to-peer communication, etc. In addition, the D2D communication is applicable to machine-to-machine (M2M) communication, machine type communication (MTC), and so on.

The D2D communication has been considered as a method of reducing the burden of an eNB caused by a rapid increase in data traffic. In D2D communication systems, devices may exchange data directly with each other without intervention from the eNB, and thus the overhead of a network may be reduced compared to legacy wireless communication systems. Further, it is expected that the introduction of the D2D communication will reduce the procedures of the eNB, reduce the power consumption of devices participating in the D2D communication, increase data transmission rates, increase the accommodation capability of the network, distribute loads, and extend cell coverage.

Recently, vehicle-to-everything (V2X) communication has been discussed in relation to the D2D communication. The V2X communication covers vehicle-to-vehicle (V2V) communication between vehicles, vehicle-to-pedestrian (V2P) communication between a vehicle and a different kind of device, and vehicle-to-infrastructure (V2I) communication between a vehicle and a roadside unit (RSU).

DISCLOSURE

Technical Problem

The object of the present disclosure is to provide a method of performing efficient vehicle-to-everything (V2X) communication in a power-limited case by adjusting V2X message transmission powers on several carriers when a V2X UE transmits V2X messages on a plurality of carriers configured for carrier aggregation (CA) in V2X communication.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method of transmitting a sidelink signal by a user equipment (UE) in a wireless communication system is provided. The method may include: determining a transmission power of a sidelink packet for each of a plurality of carriers; and transmitting the sidelink signal on at least one carrier among the plurality of carriers based on the determined transmission power. The transmission power may be determined based on priorities of sidelink packets scheduled to be respectively transmitted on the plurality of carriers, a sum of transmission powers of the sidelink packets scheduled to be respectively transmitted on the plurality of carriers, and a maximum transmission power of the UE.

In another aspect of the present disclosure, an apparatus for transmitting a sidelink signal in a wireless communication system is provided. The apparatus may include: a memory; and a processor coupled to the memory. The processor may be configured to determine a transmission power of a sidelink packet for each of a plurality of carriers and transmit the sidelink signal on at least one carrier among the plurality of carriers based on the determined transmission power. The transmission power may be determined based on priorities of sidelink packets scheduled to be respectively transmitted on the plurality of carriers, a sum of transmission powers of the sidelink packets scheduled to be respectively transmitted on the plurality of carriers, and a maximum transmission power of the apparatus.

Transmission resources of the sidelink packets scheduled to be respectively transmitted on the plurality of carriers may overlap at least partially in a time domain.

When the sum of the transmission powers of the sidelink packets scheduled to be respectively transmitted on the plurality of carriers exceeds the maximum transmission power, first transmission power adjustment may be performed. The first transmission power adjustment may reduce transmission powers of packets except a packet with a highest priority among the sidelink packets scheduled to be respectively transmitted on the plurality of carriers.

The transmission powers of the packets except the packet with the highest priority may be reduced at a same rate or at different rates.

The transmission powers of the packets except the packet with the highest priority may be reduced sequentially from a packet with a lowest priority.

The first transmission power adjustment may be performed until the sum of the transmission powers of the sidelink packets scheduled to be respectively transmitted on the plurality of carriers after the transmission power adjustment becomes less than or equal to the maximum transmission power.

When the sum of the transmission powers of the sidelink packets scheduled to be respectively transmitted on the plurality of carriers is more than the maximum transmission power after the transmission powers of the packets except the packet with the highest priority are reduced to zero, second transmission power adjustment for reducing transmission powers of all packets may be performed.

The transmission powers of all packets may be reduced at a same rate or at different rates.

When the sum of the transmission powers of the sidelink packets scheduled to be respectively transmitted on the plurality of carriers exceeds the maximum transmission power, third transmission power adjustment may be performed. The third transmission power adjustment may reduce a transmission power of a packet with a lowest priority among the sidelink packets scheduled to be respectively transmitted on the plurality of carriers until the sum of the transmission powers of the sidelink packets scheduled to be respectively transmitted on the plurality of carriers becomes less than or equal to the maximum transmission power.

The third transmission power adjustment is sequentially performed from the packet with the lowest priority until the sum of the transmission powers of the sidelink packets scheduled to be respectively transmitted on the plurality of carriers becomes less than or equal to the maximum transmission power is performed.

The apparatus may communicate with at least one of a mobile terminal, a network, or an autonomous driving vehicle other than the apparatus.

Advantageous Effects

According to the present disclosure, transmission may be performed while requirements for packet priorities are fully satisfied in a situation that transmission power is limited.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the disclosure.

BEST MODE

Figure 1:
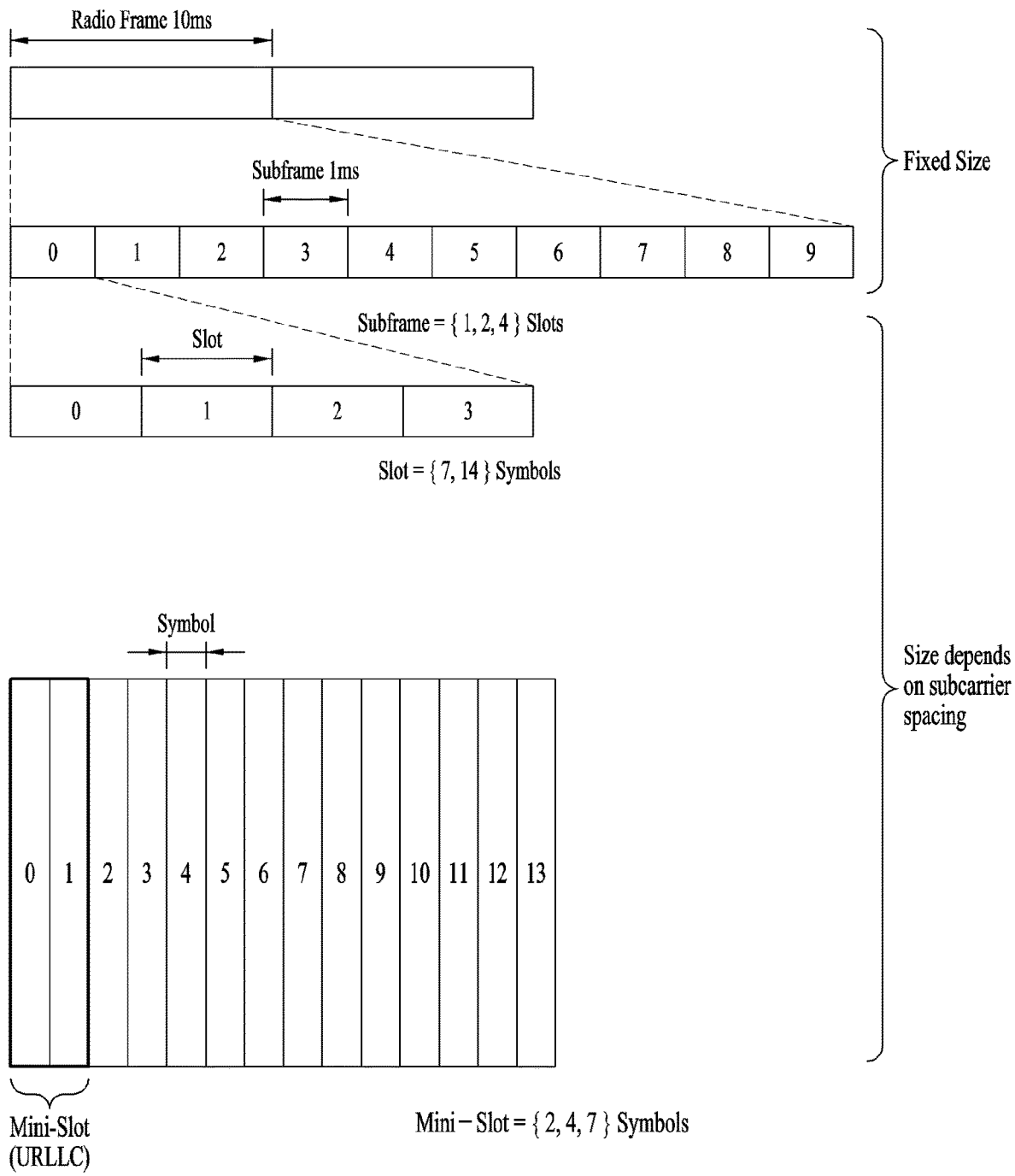
FIG. 1 illustrates a frame structure in new radio (NR).

In this document, downlink (DL) communication refers to communication from a base station (BS) to a user equipment (UE), and uplink (UL) communication refers to communication from the UE to the BS. In DL, a transmitter may be a part of the BS and a receiver may be a part of the UE. In UL, a transmitter may be a part of the UE and a receiver may be a part of the BS. Herein, the BS may be referred to as a first communication device, and the UE may be referred to as a second communication device. The term 'BS' may be replaced with 'fixed station', 'Node B', 'evolved Node B (eNB)', 'next-generation node B (gNB)', 'base transceiver system (BTS)', 'access point (AP)', 'network node', 'fifth-generation (5G) network node', 'artificial intelligence (AI) system', 'road side unit (RSU)', 'robot', etc. The term 'UE' may be replaced with 'terminal', 'mobile station (MS)', 'user terminal (UT)', 'mobile subscriber station (MSS)', 'subscriber station (SS)', 'advanced mobile station (AMS)', 'wireless terminal (WT)', 'machine type communication (MTC) device', 'machine-to-machine (M2M) device', 'device-to-device (D2D) device', 'vehicle', 'robot', 'AI module', etc.

The technology described herein is applicable to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented as radio technology such as universal terrestrial radio access (UTRA) or CDMA2000. The TDMA may be implemented as radio technology such as global system for mobile communications (GSM), general packet radio service (GPRS), or enhanced data rates for GSM evolution (EDGE). The OFDMA may be implemented as radio technology such as the Institute of Electrical and Electronics Engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of evolved UMTS (E-UMTS) using E-UTRA. LTE-advance (LTE-A) or LTE-A pro is an evolved version of 3GPP LTE. 3GPP new radio or new radio access technology (3GPP NR) is an evolved version of 3GPP LTE, LTE-A, or LTE-A pro.

Although the present disclosure is described based on 3GPP communication systems (e.g., LTE-A, NR, etc.) for clarity of description, the spirit of the present disclosure is not limited thereto. LTE refers to technologies beyond 3GPP technical specification (TS) 36.xxx Release 8. In particular, LTE technologies beyond 3GPP TS 36.xxx Release 10 are referred to as LTE-A, and LTE technologies beyond 3GPP TS 36.xxx Release 13 are referred to as LTE-A pro. 3GPP NR refers to technologies beyond 3GPP TS 38.xxx Release 15. LTE/NR may be called '3GPP system'. Herein, "xxx" refers to a standard specification number.

In the present disclosure, a node refers to a fixed point capable of transmitting/receiving a radio signal for communication with a UE. Various types of BSs may be used as the node regardless of the names thereof. For example, the node may include a BS, a node B (NB), an eNB, a pico-cell eNB (PeNB), a home eNB (HeNB), a relay, a repeater, etc. A device other than the BS may be the node. For example, a radio remote head (RRH) or a radio remote unit (RRU) may be the node. The RRH or RRU generally has a lower power level than that of the BS. At least one antenna is installed for each node. The antenna may refer to a physical antenna or mean an antenna port, a virtual antenna, or an antenna group. The node may also be referred to as a point.

In the present disclosure, a cell refers to a prescribed geographical area in which one or more nodes provide communication services or a radio resource. When a cell refers to a geographical area, the cell may be understood as the coverage of a node where the node is capable of providing services using carriers. When a cell refers to a radio resource, the cell may be related to a bandwidth (BW), i.e., a frequency range configured for carriers. Since DL coverage, a range within which the node is capable of transmitting a valid signal, and UL coverage, a range within which the node is capable of receiving a valid signal from the UE, depend on carriers carrying the corresponding signals, the coverage of the node may be related to the coverage of the cell, i.e., radio resource used by the node. Accordingly, the term "cell" may be used to indicate the service coverage of a node, a radio resource, or a range to which a signal transmitted on a radio resource can reach with valid strength.

In the present disclosure, communication with a specific cell may mean communication with a BS or node that provides communication services to the specific cell. In addition, a DL/UL signal in the specific cell refers to a DL/UL signal from/to the BS or node that provides communication services to the specific cell. In particular, a cell providing DL/UL communication services to a UE may be called a serving cell. The channel state/quality of the specific cell may refer to the channel state/quality of a communication link formed between the BS or node, which provides communication services to the specific cell, and the UE.

When a cell is related to a radio resource, the cell may be defined as a combination of DL and UL resources, i.e., a combination of DL and UL component carriers (CCs). The cell may be configured to include only DL resources or a combination of DL and UL resources. When carrier aggregation is supported, a linkage between the carrier frequency of a DL resource (or DL CC) and the carrier frequency of a UL resource (or UL CC) may be indicated by system information transmitted on a corresponding cell. The carrier frequency may be equal to or different from the center frequency of each cell or CC. A cell operating on a primary frequency may be referred to as a primary cell (Pcell) or PCC, and a cell operating on a secondary frequency may be referred to as a secondary cell (Scell) or SCC. The Scell may be configured after the UE and BS establish a radio resource control (RRC) connection therebetween by performing an RRC connection establishment procedure, that is, after the UE enters the RRC_CONNECTED state. The RRC connection may mean a path that enables the RRC of the UE and the RRC of the BS to exchange an RRC message. The Scell may be configured to provide additional radio resources to the UE. The Scell and the Pcell may form a set of serving cells for the UE depending on the capabilities of the UE. When the UE is not configured with carrier aggregation or does not support the carrier aggregation although the UE is in the RRC_CONNECTED state, only one serving cell configured with the Pcell exists.

A cell supports a unique radio access technology (RAT). For example, transmission/reception in an LTE cell is performed based on the LTE RAT, and transmission/reception in a 5G cell is performed based on the 5G RAT.

The carrier aggregation is a technology for combining a plurality of carriers each having a system BW smaller than a target BW to support broadband. The carrier aggregation is different from OFDMA in that in the former, DL or UL communication is performed on a plurality of carrier frequencies each forming a system BW (or channel BW) and in the latter, DL or UL communication is performed by dividing a base frequency band into a plurality of orthogonal subcarriers and loading the subcarriers in one carrier frequency. For example, in OFDMA or orthogonal frequency division multiplexing (OFDM), one frequency band with a predetermined system BW is divided into a plurality of subcarriers with a predetermined subcarrier spacing, and information/data is mapped to the plurality of subcarriers. Frequency up-conversion is applied to the frequency band to which the information/data is mapped, and the information/data is transmitted on the carrier frequency in the frequency band. In wireless carrier aggregation, multiple frequency bands, each of which has its own system BW and carrier frequency, may be simultaneously used for communication, and each frequency band used in the carrier aggregation may be divided into a plurality of subcarriers with a predetermined subcarrier spacing.

3GPP communication specifications define DL physical channels corresponding to resource elements carrying information originating from higher (upper) layers of physical layers (e.g., a medium access control (MAC) layer, a radio link control (RLC) layer, a protocol data convergence protocol (PDCP) layer, an RRC layer, a service data adaptation protocol (SDAP) layer, a non-access stratum (NAS) layer, etc.) and DL physical signals corresponding to resource elements which are used by physical layers but do not carry information originating from higher layers. For example, a physical downlink shared channel (PDSCH), a physical broadcast channel (PBCH), a physical multicast channel (PMCH), a physical control format indicator channel (PCFICH), and a physical downlink control channel (PDCCH) are defined as the DL physical channels, and a reference signal and a synchronization signal are defined as the DL physical signals. A reference signal (RS), which is called a pilot signal, refers to a predefined signal with a specific waveform known to both the BS and UE. For example, a cell-specific RS (CRS), a UE-specific RS (UE-RS), a positioning RS (PRS), a channel state information RS (CSI-RS), and a demodulation reference signal (DMRS) may be defined as DL RSs. In addition, the 3GPP communication specifications define UL physical channels corresponding to resource elements carrying information originating from higher layers and UL physical signals corresponding to resource elements which are used by physical layers but do not carry information originating from higher layers. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signals.

In the present disclosure, the PDCCH and the PDSCH may refer to a set of time-frequency resources or resource elements carrying downlink control information (DCI) of the physical layer and a set of time-frequency resources or resource elements carrying DL data thereof, respectively. The PUCCH, the PUSCH, and the PRACH may refer to a set of time-frequency resources or resource elements carrying uplink control information (UCI) of the physical layer, a set of time-frequency resources or resource elements carrying UL data thereof, and a set of time-frequency resources or resource elements carrying random access signals thereof, respectively. When it is said that a UE transmits a UL physical channel (e.g., PUCCH, PUSCH, PRACH, etc.), it may mean that the UE transmits UCI, UL data, or a random access signal on or over the corresponding UL physical channel. When it is said that the BS receives a UL physical channel, it may mean that the BS receives UCI, UL data, a random access signal on or over the corresponding UL physical channel. When it is said that the BS transmits a DL physical channel (e.g., PDCCH, PDSCH, etc.), it may mean that the BS transmits DCI or UL data on or over the corresponding DL physical channel. When it is said that the UE receives a DL physical channel, it may mean that the UE receives DCI or UL data on or over the corresponding DL physical channel.

In the present disclosure, a transport block may mean the payload for the physical layer. For example, data provided from the higher layer or MAC layer to the physical layer may be referred to as the transport block.

In the present disclosure, hybrid automatic repeat request (HARQ) may mean a method used for error control. A HARQ acknowledgement (HARQ-ACK) transmitted in DL is used to control an error for UL data, and a HARQ-ACK transmitted in UL is used to control an error for DL data. A transmitter that performs the HARQ operation waits for an ACK signal after transmitting data (e.g. transport blocks or codewords). A receiver that performs the HARQ operation transmits an ACK signal only when the receiver correctly receives data. If there is an error in the received data, the receiver transmits a negative ACK (NACK) signal. Upon receiving the ACK signal, the transmitter may transmit (new) data but, upon receiving the NACK signal, the transmitter may retransmit the data. Meanwhile, there may be a time delay until the BS receives ACK/NACK from the UE and retransmits data after transmitting scheduling information and data according to the scheduling information. The time delay occurs due to a channel propagation delay or a time required for data decoding/encoding. Accordingly, if new data is transmitted after completion of the current HARQ process, there may be a gap in data transmission due to the time delay. To avoid such a gap in data transmission during the time delay, a plurality of independent HARQ processes are used. For example, when there are 7 transmission occasions between initial transmission and retransmission, a communication device may perform data transmission with no gap by managing 7 independent HARQ processes. When the communication device uses a plurality of parallel HARQ processes, the communication device may successively perform UL/DL transmission while waiting for HARQ feedback for previous UL/DL transmission.

In the present disclosure, CSI collectively refers to information indicating the quality of a radio channel (also called a link) created between a UE and an antenna port. The CSI includes at least one of a channel quality indicator (CQI), a precoding matrix indicator (PMI), a CSI-RS resource indicator (CRI), an SSB resource indicator (SSBRI), a layer indicator (LI), a rank indicator (RI), or a reference signal received power (RSRP).

In the present disclosure, frequency division multiplexing (FUM) may mean that signals/channels/users are transmitted/received on different frequency resources, and time division multiplexing (TDM) may mean that signals/channels/users are transmitted/received on different time resources.

In the present disclosure, frequency division duplex (FDD) refers to a communication scheme in which UL communication is performed on a UL carrier and DL communication is performed on a DL carrier linked to the UL carrier, and time division duplex (TDD) refers to a communication scheme in which UL and DL communication are performed by splitting time.

The details of the background, terminology, abbreviations, etc. used herein may be found in documents published before the present disclosure. For example, 3GPP TS 24 series, 3GPP TS 34 series, and 3GPP TS 38 series may be referenced (http://www.3gpp.org/specifications/specification-numbering).

Frame Structure

FIG. 1 is a diagram illustrating a frame structure in NR.

The NR system may support multiple numerologies. The numerology is defined by a subcarrier spacing and cyclic prefix (CP) overhead. A plurality of subcarrier spacings may be derived by scaling a basic subcarrier spacing by an integer N (or $\mu$). The numerology may be selected independently of the frequency band of a cell although it is assumed that a small subcarrier spacing is not used at a high carrier frequency. In addition, the NR system may support various frame structures based on the multiple numerologies.

Hereinafter, an OFDM numerology and a frame structure, which may be considered in the NR system, will be described. Table 1 shows multiple OFDM numerologies supported in the NR system. The value of $\mu$ for a bandwidth part and a CP may be obtained by RRC parameters provided by the BS.

TABLE 1

| $\mu$ | $\Delta f = 2^\mu * 15$ [kHz] | Cyclic prefix(CP) |
| --- | --- | --- |
| 0 | 15 | Normal |
| 1 | 30 | Normal |
| 2 | 60 | Normal, Extended |
| 3 | 120 | Normal |
| 4 | 240 | Normal |

The NR system supports multiple numerologies (e.g., subcarrier spacings) to support various 5G services. For example, the NR system supports a wide area in conventional cellular bands in a subcarrier spacing of 15 kHz and supports a dense urban environment, low latency, and wide carrier BW in a subcarrier spacing of 30/60 kHz. In a subcarrier spacing of 60 kHz or above, the NR system supports a BW higher than 24.25 GHz to overcome phase noise.

Resource Grid

Figure 2:
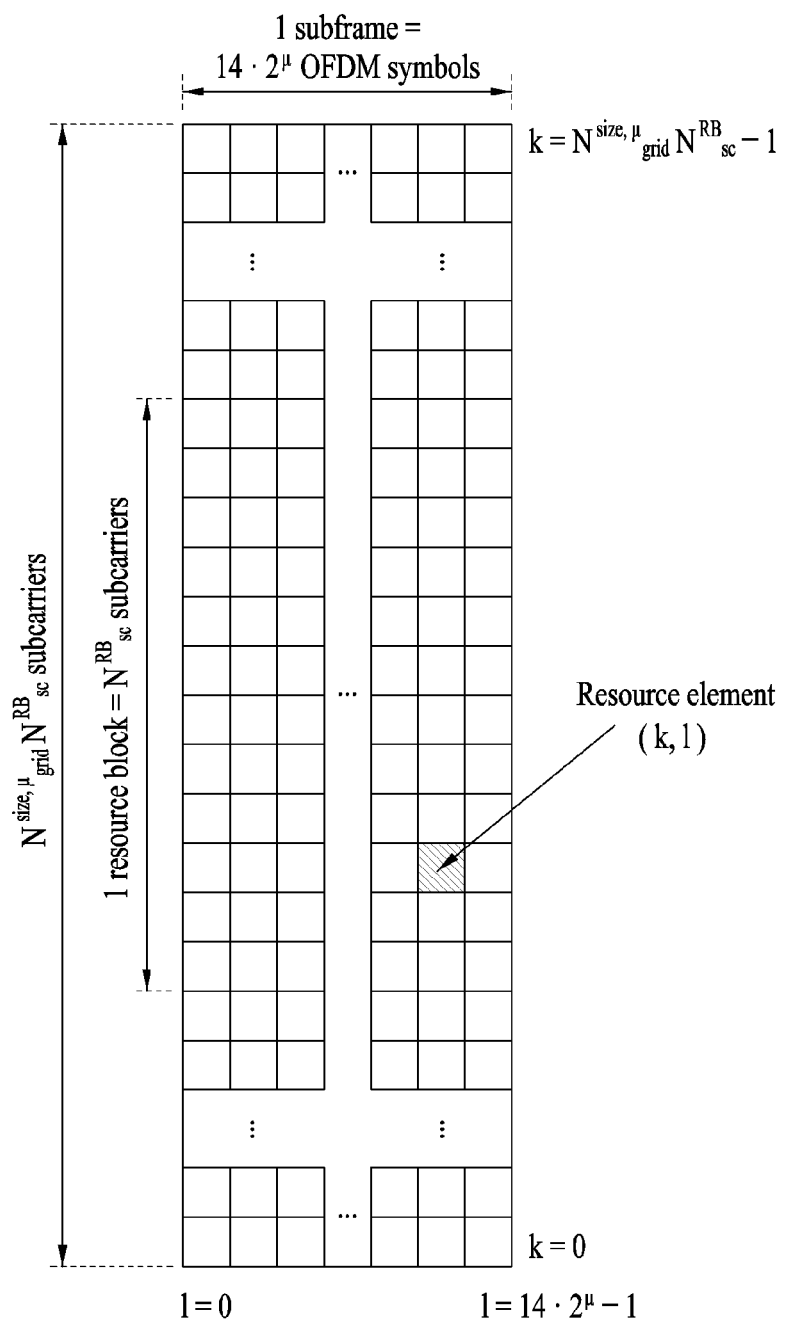
FIG. 2 illustrates a resource grid in NR.

FIG. 2 illustrates a resource grid in the NR.

Referring to FIG. 2, a resource grid consisting of $N^{size,\mu}_{grid} * N^{RB}_{sc}$ subcarriers and $14*2^\mu$ OFDM symbols may be defined for each subcarrier spacing configuration and carrier, where $N^{size,\mu}_{grid}$ is indicated by RRC signaling from the BS. $N^{size,\mu}_{grid}$ may vary not only depending on the subcarrier spacing configuration $\mu$ but also between UL and DL. One resource grid exists for the subcarrier spacing configuration $\mu$, an antenna port p, and a transmission direction (i.e., UL or DL). Each element in the resource gird for the subcarrier spacing configuration $\mu$ and the antenna port p may be referred to as a resource element and identified uniquely by an index pair of (k, l), where k denotes an index in the frequency domain and l denotes the relative location of a symbol in the frequency domain with respect to a reference point. The resource element (k, l) for the subcarrier spacing configuration $\mu$ and the antenna port p may be a physical resource and a complex value, $a^{(p,\mu)}_{k,l}$. A resource block (RB) is defined as $N^{RB}_{sc}$ consecutive subcarriers in the frequency domain (where $N^{RB}_{sc}=12$.

Considering the point that the UE is incapable of supporting a wide BW supported in the NR system, the UE may be configured to operate in a part of the frequency BW of a cell (hereinafter referred to as a bandwidth part (BWP)).

Bandwidth Part (BWP)

The NR system may support up to 400 MHz for each carrier. If the UE always keeps a radio frequency (RF) module on for all carriers while operating on such a wideband carrier, the battery consumption of the UE may increase. Considering multiple use cases (e.g., eMBB, URLLC, mMTC, V2X, etc.) operating in one wideband carrier, a different numerology (e.g., subcarrier spacing) may be supported for each frequency band of the carrier. Further, considering that each UE may have a different capability regarding the maximum BW, the BS may instruct the UE to operate only in a partial BW rather than the whole BW of the wideband carrier. The partial bandwidth is referred to as the BWP. The BWP is a subset of contiguous common RBs defined for numerology pi in BWP i of the carrier in the frequency domain, and one numerology (e.g., subcarrier spacing, CP length, and/or slot/mini-slot duration) may be configured for the BWP.

The BS may configure one or more BWPs in one carrier configured for the UE. Alternatively, if UEs are concentrated in a specific BWP, the BS may move some UEs to another BWP for load balancing. For frequency-domain inter-cell interference cancellation between neighbor cells, the BS may configure BWPs on both sides of a cell except for some central spectra in the whole BW in the same slot. That is, the BS may configure at least one DL/UL BWP for the UE associated with the wideband carrier, activate at least one of DL/UL BWP(s) configured at a specific time (by L1 signaling which is a physical-layer control signal, a MAC control element (CE) which is a MAC-layer control signal, or RRC signaling), instruct the UE to switch to another configured DL/UL BWP (by L1 signaling, a MAC CE, or RRC signaling), or set a timer value and switch the UE to a predetermined DL/UL BWP upon expiration of the timer value. In particular, an activated DL/UL BWP is referred to as an active DL/UL BWP. While performing initial access or before setting up an RRC connection, the UE may not receive a DL/UL BWP configuration. A DL/UL BWP that the UE assumes in this situation is referred to as an initial active DL/UL BWP.

Synchronization Acquisition of Sidelink UE

In time division multiple access (TDMA) and frequency division multiple access (FDMA) systems, accurate time and frequency synchronization is essential. If time and frequency synchronization is not accurate, inter-symbol interference (ISI) and inter-carrier interference (ICI) may occur so that system performance may be degraded. This may occur in V2X. For time/frequency synchronization in V2X, a sidelink synchronization signal (SLSS) may be used in the physical layer, and master information block-sidelink-V2X (MIB-SL-V2X) may be used in the RLC layer.

Figure 3:
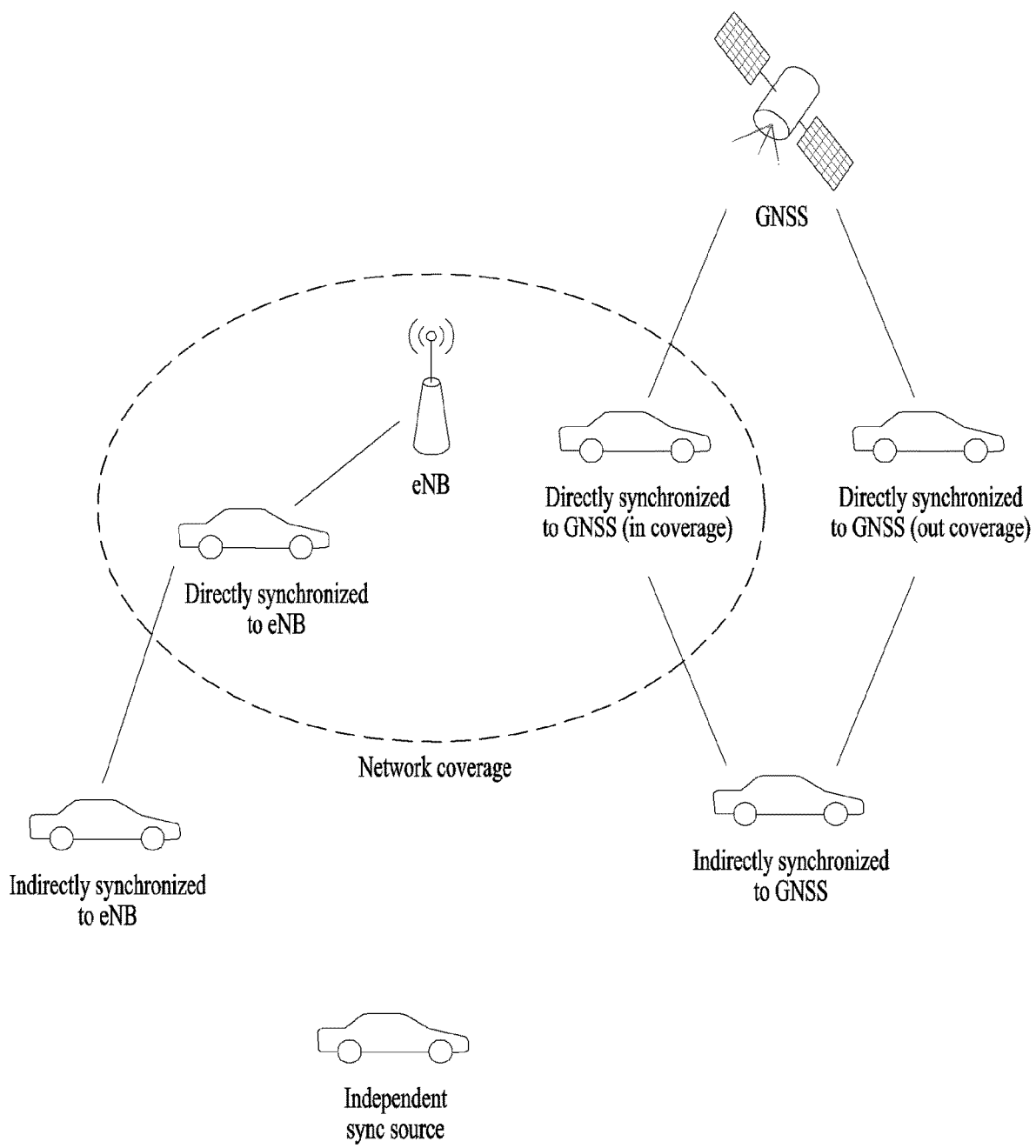
FIG. 3 illustrates sidelink synchronization

FIG. 3 illustrates a synchronization source and a synchronization reference in V2X.

Referring to FIG. 3, in V2X, a UE may be directly synchronized to global navigation satellite systems (GNSS) or indirectly synchronized to the GNSS through another UE (in or out of the network coverage) that is directly synchronized to the GNSS. When the GNSS is set to the synchronization source, the UE may calculate a direct frame number (DFN) and a subframe number based on coordinated universal time (UTC) and a (pre)configured DFN offset.

Alternatively, the UE may be directly synchronized to the BS or synchronized to another UE that is time/frequency synchronized to the BS. For example, if the UE is in the coverage of the network, the UE may receive synchronization information provided by the BS and be directly synchronized to the BS. Thereafter, the UE may provide the synchronization information to another adjacent UE. If the timing of the BS is set to the synchronization reference, the UE may follow a cell associated with a corresponding frequency (if the UE is in the cell coverage at the corresponding frequency) or follow a Pcell or serving cell (if the UE is out of the cell coverage at the corresponding frequency) for synchronization and DL measurement.

The serving cell (BS) may provide a synchronization configuration for carriers used in V2X sidelink communication. In this case, the UE may follow the synchronization configuration received from the BS. If the UE detects no cell from the carriers used in the V2X sidelink communication and receives no synchronization configuration from the serving cell, the UE may follow a predetermined synchronization configuration.

Alternatively, the UE may be synchronized to another UE that fails to directly or indirectly obtain the synchronization information from the BS or GNSS. The synchronization source and preference may be preconfigured for the UE or configured in a control message from the BS.

Hereinbelow, the SLSS and synchronization information will be described.

The SLSS may be a sidelink-specific sequence and include a primary sidelink synchronization signal (PSSS) and a secondary sidelink synchronization signal (SSSS).

Each SLSS may have a physical layer sidelink synchronization identity (ID), and the value may be, for example, any of 0 to 335. The synchronization source may be identified depending on which of the above values is used. For example, 0, 168, and 169 may indicate the GNSS, 1 to 167 may indicate the BS, and 170 to 335 may indicate out-of-coverage. Alternatively, among the values of the physical layer sidelink synchronization ID, 0 to 167 may be used by the network, and 168 to 335 may be used for the out-of-coverage state.

Figure 4:
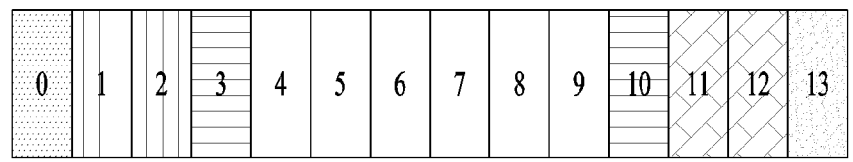
FIG. 4 illustrates a time resource unit for transmitting a sidelink synchronization signal.
Figure 4:
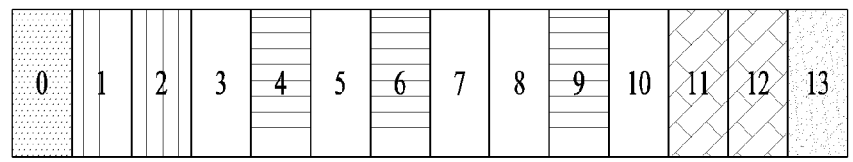
Figure 4:
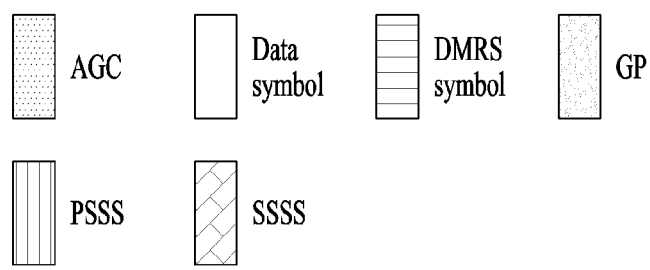

FIG. 4 illustrates a time resource unit for SLSS transmission. The time resource unit may be a subframe in LTE/LTE-A and a slot in 5G. The details may be found in 3GPP TS 36 series or 3GPP TS 28 series. A physical sidelink broadcast channel (PSBCH) may refer to a channel for carrying (broadcasting) basic (system) information that the UE needs to know before sidelink signal transmission and reception (e.g., SLSS-related information, a duplex mode (DM), a TDD UL/DL configuration, information about a resource pool, the type of an SLSS-related application, a subframe offset, broadcast information, etc.). The PSBCH and SLSS may be transmitted in the same time resource unit, or the PSBCH may be transmitted in a time resource unit after that in which the SLSS is transmitted. A DMRS may be used to demodulate the PSBCH.

Sidelink Transmission Mode

For sidelink communication, transmission modes 1, 2, 3 and 4 are used.

In transmission mode 1/3, the BS performs resource scheduling for UE 1 over a PDCCH (more specifically, DCI) and UE 1 performs D2D/V2X communication with UE 2 according to the corresponding resource scheduling. After transmitting sidelink control information (SCI) to UE 2 over a physical sidelink control channel (PSCCH), UE 1 may transmit data based on the SCI over a physical sidelink shared channel (PSSCH). Transmission modes 1 and 3 may be applied to D2D and V2X, respectively.

Transmission mode 2/4 may be a mode in which the UE performs autonomous scheduling (self-scheduling). Specifically, transmission mode 2 is applied to D2D. The UE may perform D2D operation by autonomously selecting a resource from a configured resource pool. Transmission mode 4 is applied to V2X. The UE may perform V2X operation by autonomously selecting a resource from a selection window through a sensing process. After transmitting the SCI to UE 2 over the PSCCH, UE 1 may transmit data based on the SCI over the PSSCH. Hereinafter, the term 'transmission mode' may be simply referred to as 'mode'.

Control information transmitted by a BS to a UE over a PDCCH may be referred to as DCI, whereas control information transmitted by a UE to another UE over a PSCCH may be referred to as SCI. The SCI may carry sidelink scheduling information. The SCI may have several formats, for example, SCI format 0 and SCI format 1.

SCI format 0 may be used for scheduling the PSSCH. SCI format 0 may include a frequency hopping flag (1 bit), a resource block allocation and hopping resource allocation field (the number of bits may vary depending on the number of sidelink RBs), a time resource pattern (7 bits), a modulation and coding scheme (MCS) (5 bits), a time advance indication (11 bits), a group destination ID (8 bits), etc.

SCI format 1 may be used for scheduling the PSSCH. SCI format 1 may include a priority (3 bits), a resource reservation (4 bits), the location of frequency resources for initial transmission and retransmission (the number of bits may vary depending on the number of sidelink subchannels), a time gap between initial transmission and retransmission (4 bits), an MCS (5 bits), a retransmission index (1 bit), a reserved information bit, etc. Hereinbelow, the term 'reserved information bit' may be simply referred to as 'reserved bit'. The reserved bit may be added until the bit size of SCI format 1 becomes 32 bits.

SCI format 0 may be used for transmission modes 1 and 2, and SCI format 1 may be used for transmission modes 3 and 4.

Sidelink Resource Pool

Figure 5:
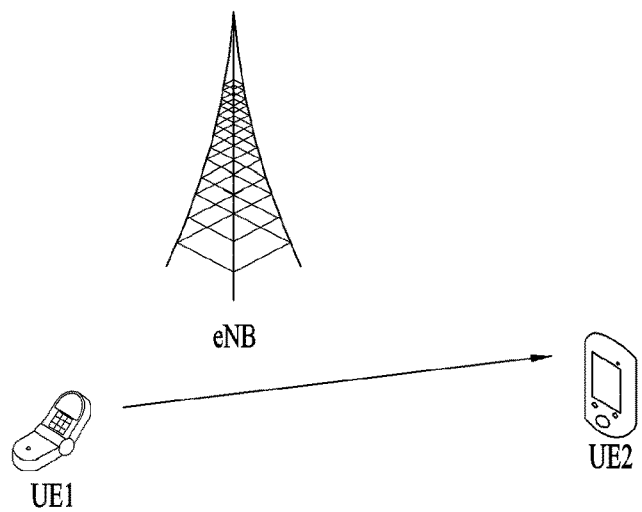
FIG. 5 illustrates a sidelink resource pool.
Figure 5:
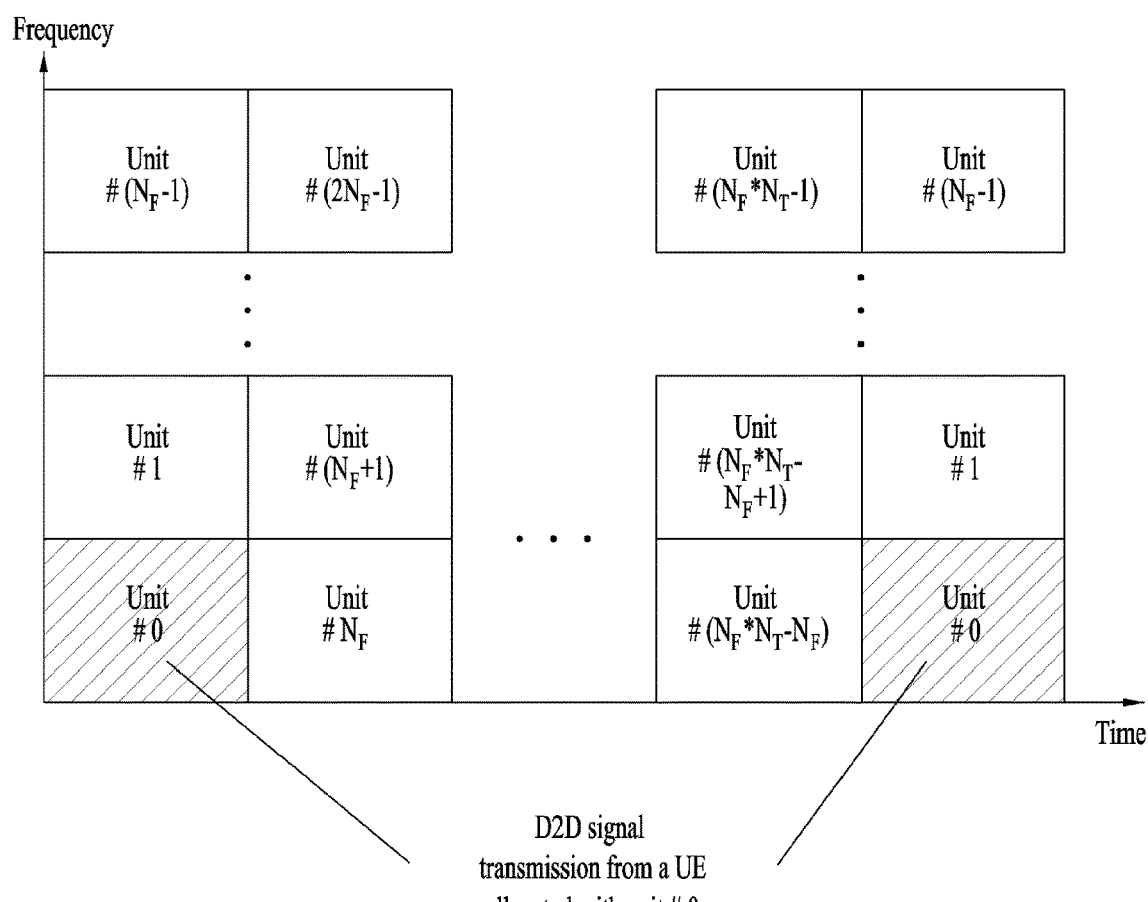

FIG. 5 shows an example of a first UE (UE1), a second UE (UE2) and a resource pool used by UE1 and UE2 performing sidelink communication.

Figure 8:
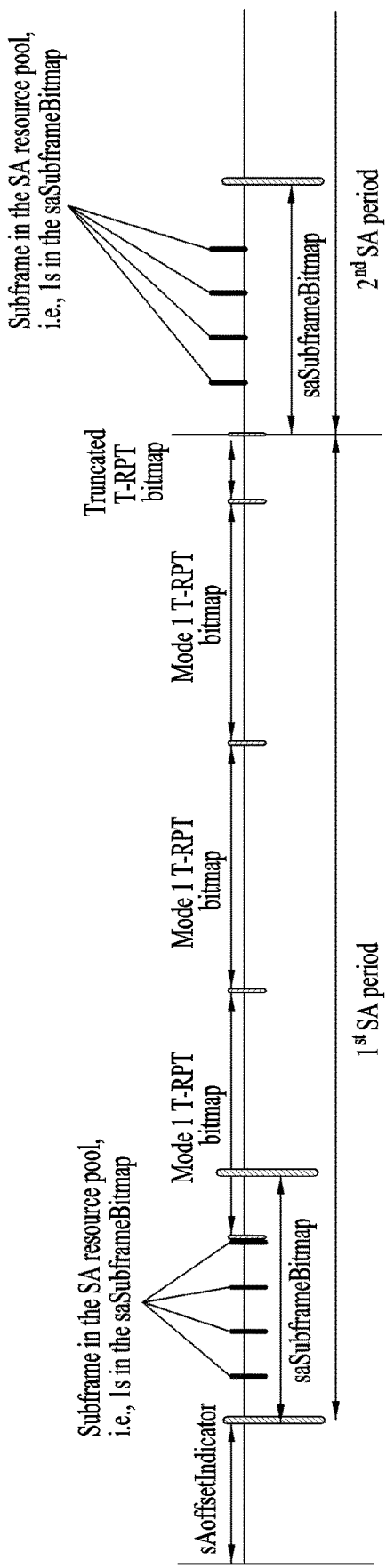
FIG. 8 illustrates transmission of a physical sidelink control channel (PSCCH).

In FIG. 5(*a*), a UE corresponds to a terminal or such a network device as a BS transmitting and receiving a signal according to a sidelink communication scheme. A UE selects a resource unit corresponding to a specific resource from a resource pool corresponding to a set of resources and the UE transmits a sidelink signal using the selected resource unit. UE2 corresponding to a receiving UE receives a configuration of a resource pool in which UE1 is able to transmit a signal and detects a signal of UE1 in the resource pool. In this case, if UE1 is located in the coverage of a BS, the BS may inform UE1 of the resource pool. If UE1 is located out of the coverage of the BS, the resource pool may be informed by a different UE or may be determined by a predetermined resource. In general, a resource pool includes a plurality of resource units. A UE selects one or more resource units from among a plurality of the resource units and may be able to use the selected resource unit(s) for sidelink signal transmission. FIG. 5(*b*) shows an example of configuring a resource unit. Referring to FIG. 8(*b*), the entire frequency resources are divided into the NF number of resource units and the entire time resources are divided into the NT number of resource units. In particular, it is able to define NF*NT number of resource units in total. In particular, a resource pool may be repeated with a period of NT subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a sidelink signal.

A resource pool may be classified into various types. First of all, the resource pool may be classified according to contents of a sidelink signal transmitted via each resource pool. For example, the contents of the sidelink signal may be classified into various signals and a separate resource pool may be configured according to each of the contents. The contents of the sidelink signal may include a scheduling assignment (SA or physical sidelink control channel (PSCCH)), a sidelink data channel, and a discovery channel. The SA may correspond to a signal including information on a resource position of a sidelink data channel, information on a modulation and coding scheme (MCS) necessary for modulating and demodulating a data channel, information on a MIMO transmission scheme, information on a timing advance (TA), and the like. The SA signal may be transmitted on an identical resource unit in a manner of being multiplexed with sidelink data. In this case, an SA resource pool may correspond to a pool of resources that an SA and sidelink data are transmitted in a manner of being multiplexed. The SA signal may also be referred to as a sidelink control channel or a physical sidelink control channel (PSCCH). The sidelink data channel (or, physical sidelink shared channel (PSSCH)) corresponds to a resource pool used by a transmitting UE to transmit user data. If an SA and a sidelink data are transmitted in a manner of being multiplexed in an identical resource unit, sidelink data channel except SA information may be transmitted only in a resource pool for the sidelink data channel. In other word, REs, which are used to transmit SA information in a specific resource unit of an SA resource pool, may also be used for transmitting sidelink data in a sidelink data channel resource pool. The discovery channel may correspond to a resource pool for a message that enables a neighboring UE to discover transmitting UE transmitting information such as ID of the UE, and the like.

Despite the same contents, sidelink signals may use different resource pools according to the transmission and reception properties of the sidelink signals. For example, despite the same sidelink data channels or the same discovery messages, they may be distinguished by different resource pools according to transmission timing determination schemes for the sidelink signals (e.g., whether a sidelink signal is transmitted at the reception time of a synchronization reference signal or at a time resulting from applying a predetermined TA to the reception time of the synchronization reference signal), resource allocation schemes for the sidelink signals (e.g., whether a BS configures the transmission resources of an individual signal for an individual transmitting UE or the individual transmitting UE autonomously selects the transmission resources of an individual signal in a pool), the signal formats of the sidelink signals (e.g., the number of symbols occupied by each sidelink signal in one subframe or the number of subframes used for transmission of a sidelink signal), signal strengths from the BS, the transmission power of a sidelink UE, and so on. In sidelink communication, a mode in which a BS directly indicates transmission resources to a sidelink transmitting UE is referred to as sidelink transmission mode 1, and a mode in which a transmission resource area is preconfigured or the BS configures a transmission resource area and the UE directly selects transmission resources is referred to as sidelink transmission mode 2. In sidelink discovery, a mode in which a BS directly indicates resources is referred to as Type 2, and a mode in which a UE selects transmission resources directly from a preconfigured resource area or a resource area indicated by the BS is referred to as Type 1.

In V2X, sidelink transmission mode 3 based on centralized scheduling and sidelink transmission mode 4 based on distributed scheduling are available.

Figure 6:
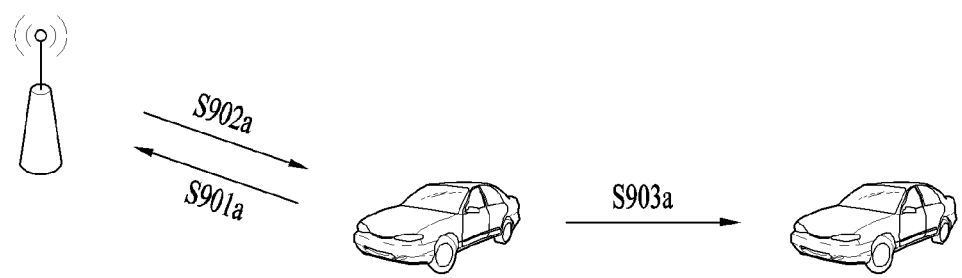
FIG. 6 illustrates scheduling schemes based on transmission modes.
Figure 6:
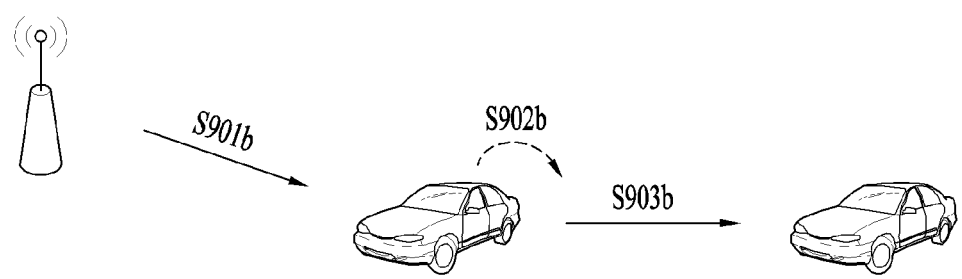

FIG. 6 illustrates scheduling schemes based on these two transmission modes. Referring to FIG. 6, in transmission mode 3 based on centralized scheduling of FIG. 6(*a*), a vehicle requests sidelink resources to a BS (S901*a*), and the BS allocates the resources (S902*a*). Then, the vehicle transmits a signal on the resources to another vehicle (S903*a*). In the centralized transmission, resources on another carrier may also be scheduled. In transmission mode 4 based on distributed scheduling of FIG. 6(*b*), a vehicle selects transmission resources (S902*b*) by sensing a resource pool, which is preconfigured by a BS (S901*b*). Then, the vehicle may transmit a signal on the selected resources to another vehicle (S903*b*).

Figure 7:
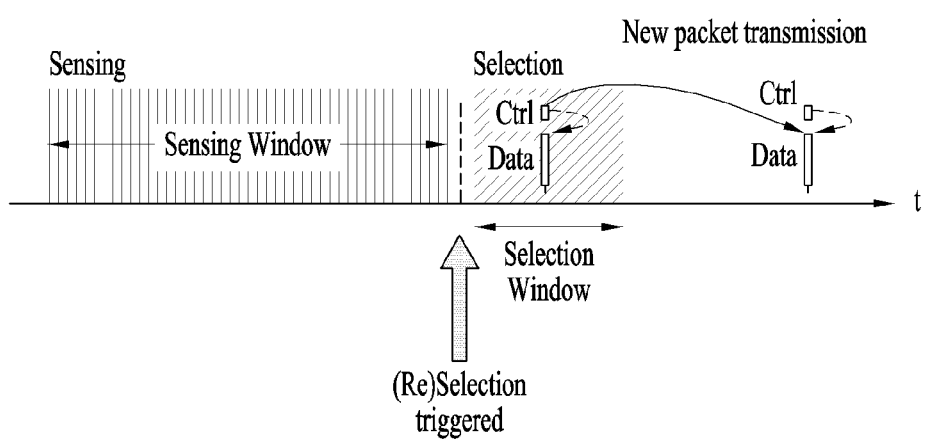
FIG. 7 illustrates selection of sidelink transmission resources.

When the transmission resources are selected, transmission resources for a next packet are also reserved as illustrated in FIG. 7. In V2X, transmission is performed twice for each MAC PDU. When resources for initial transmission are selected, resources for retransmission are also reserved with a predetermined time gap from the resources for the initial transmission. The UE may identify transmission resources reserved or used by other UEs through sensing in a sensing window, exclude the transmission resources from a selection window, and randomly select resources with less interference from among the remaining resources.

For example, the UE may decode a PSCCH including information about the cycle of reserved resources within the sensing window and measure PSSCH RSRP on periodic resources determined based on the PSCCH. The UE may exclude resources with PSCCH RSRP more than a threshold from the selection window. Thereafter, the UE may randomly select sidelink resources from the remaining resources in the selection window.

Alternatively, the UE may measure received signal strength indication (RSSI) for the periodic resources in the sensing window and identify resources with less interference, for example, the bottom 20 percent. After selecting resources included in the selection window from among the periodic resources, the UE may randomly select sidelink resources from among the resources included in the selection window. For example, when PSCCH decoding fails, the above method may be applied.

The details thereof may be found in clause 14 of 3GPP TS 3GPP TS 36.213 V14.6.0, which are incorporated herein by reference.

Transmission and Reception of PSCCH

In sidelink transmission mode 1, a UE may transmit a PSCCH (sidelink control signal, SCI, etc.) on a resource configured by a BS. In sidelink transmission mode 2, the BS may configure resources used for sidelink transmission for the UE, and the UE may transmit the PSCCH by selecting a time-frequency resource from among the configured resources.

FIG. 8 shows a PSCCH period defined for sidelink transmission mode 1 or 2.

Referring to FIG. 8, a first PSCCH (or SA) period may start in a time resource unit apart by a predetermined offset from a specific system frame, where the predetermined offset is indicated by higher layer signaling. Each PSCCH period may include a PSCCH resource pool and a time resource unit pool for sidelink data transmission. The PSCCH resource pool may include the first time resource unit in the PSCCH period to the last time resource unit among time resource units indicated as carrying a PSCCH by a time resource unit bitmap. In mode 1, since a time-resource pattern for transmission (T-RPT) or a time-resource pattern (TRP) is applied, the resource pool for sidelink data transmission may include time resource units used for actual transmission. As shown in the drawing, when the number of time resource units included in the PSCCH period except for the PSCCH resource pool is more than the number of T-RPT bits, the T-RPT may be applied repeatedly, and the last applied T-RPT may be truncated as many as the number of remaining time resource units. A transmitting UE performs transmission at a T-RPT position of 1 in a T-RPT bitmap, and transmission is performed four times in one MAC PDU.

Figure 9:
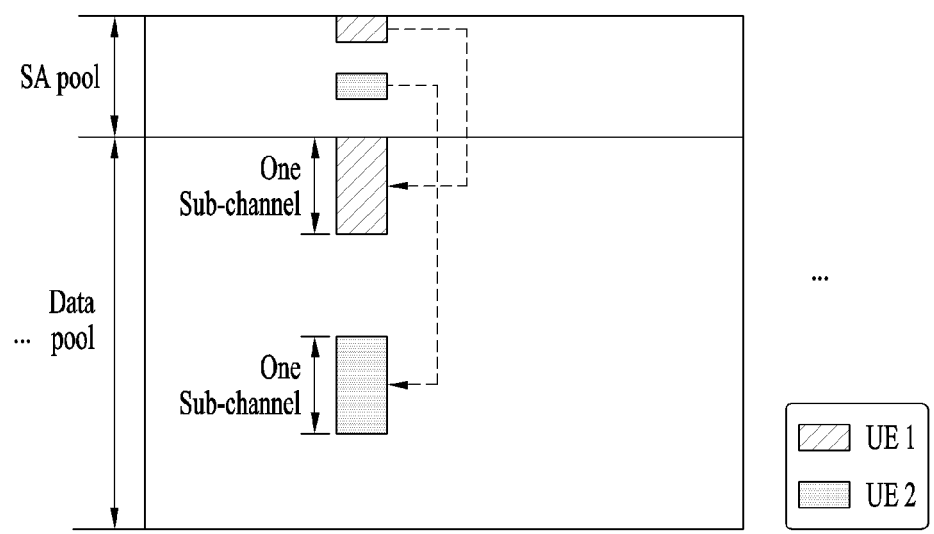
FIG. 9 illustrates PSCCH transmission in sidelink vehicle-to-everything (V2X) communication.
Figure 9:
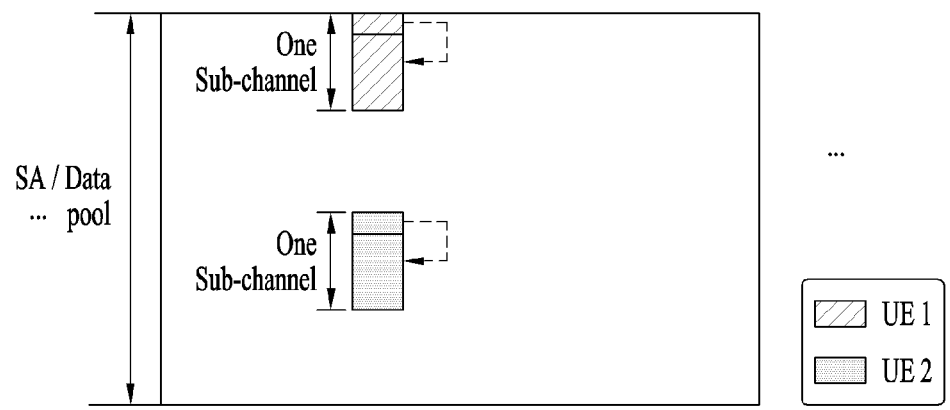

In V2X, that is, sidelink transmission mode 3 or 4, a PSCCH and data (PSSCH) are frequency division multiplexed (FDM) and transmitted, unlike sidelink communication. Since latency reduction is important in V2X in consideration of the nature of vehicle communication, the PSCCH and data are FDM and transmitted on the same time resources but different frequency resources. FIG. 9 illustrates examples of this transmission scheme. The PSCCH and data may not be contiguous to each other as illustrated in FIG. 9(*a*) or may be contiguous to each other as illustrated in FIG. 9(*b*). A subchannel is used as the basic unit for the transmission. The subchannel is a resource unit including one or more RBs in the frequency domain within a predetermined time resource (e.g., time resource unit). The number of RBs included in the subchannel, i.e., the size of the subchannel and the starting position of the subchannel in the frequency domain are indicated by higher layer signaling.

For V2V communication, a periodic type of cooperative awareness message (CAM) and an event-triggered type of decentralized environmental notification message (DENM) may be used. The CAM may include dynamic state information of a vehicle such as direction and speed, vehicle static data such as dimensions, and basic vehicle information such as ambient illumination states, path details, etc. The CAM may be 50 to 300 bytes long. In addition, the CAM is broadcast, and its latency should be less than 100 ms. The DENM may be generated upon occurrence of an unexpected incident such as a breakdown, an accident, etc. The DENM may be shorter than 3000 bytes, and it may be received by all vehicles within the transmission range. The DENM may have priority over the CAM. When it is said that messages are prioritized, it may mean that from the perspective of a UE, if there are a plurality of messages to be transmitted at the same time, a message with the highest priority is preferentially transmitted, or among the plurality of messages, the message with highest priority is transmitted earlier in time than other messages. From the perspective of multiple UEs, a high-priority message may be regarded to be less vulnerable to interference than a low-priority message, thereby reducing the probability of reception error. If security overhead is included in the CAM, the CAM may have a large message size compared to when there is no security overhead.

Sidelink Congestion Control

A sidelink radio communication environment may easily become congested according to increases in the density of vehicles, the amount of information transfer, etc. Various methods are applicable for congestion reduction. For example, distributed congestion control may be applied.

In the distributed congestion control, a UE understands the congestion level of a network and performs transmission control. In this case, the congestion control needs to be performed in consideration of the priorities of traffic (e.g., packets).

Specifically, each UE may measure a channel busy ratio (CBR) and then determine the maximum value (CRlimitk) of a channel occupancy ratio (CRk) that can be occupied by each traffic priority (e.g., k) according to the CBR. For example, the UE may calculate the maximum value (CRlimitk) of the channel occupancy ratio for each traffic priority based on CBR measurement values and a predetermined table. If traffic has a higher priority, the maximum value of the channel occupancy ratio may increase.

The UE may perform the congestion control as follows. The UE may limit the sum of the channel occupancy ratios of traffic with a priority k such that the sum does not exceed a predetermined value, where k is less than i. According to this method, the channel occupancy ratios of traffic with low priorities are further restricted.

PSSCH Transmission Power

In sidelink transmission mode 4, a UE transmission power for PSCCH transmission in subframe n, $P_{PSSCH}$ may be determined as shown in Equation 1.

$$P_{PSSCH} = 10 \log_{10}\left(\frac{M_{PSSCH}}{M_{PSSCH} + 10^{\frac{3}{10}} \times M_{PSCCH}}\right) + A\,[\text{dBm}] \quad [\text{Equation 1}]$$

In Equation 1, $P_{CMAX}$ denotes a maximum output power configured for serving cell c, and $M_{PSSCH}$ denotes a bandwidth for PSSCH resource allocation, which is represented by the number of RBs. In Equation 1, $M_{PSCCH}=2$ and $PL=PL_c$. $PL_c$ denotes a path loss in serving cell c. $P_{O\_PSSCH,4}$ and $\alpha_{PSSCH,4}$ are values indicated by higher layer signaling. If a higher layer parameter maxTxpower is configured, A is given as shown in Equation 2. Otherwise, A is given as shown in Equation 3.

$$A = \min \quad [\text{Equation 2}]$$
$$\left\{P_{CMAX}, P_{MAX\_CBR}, 10\log_{10}\left(M_{PSSCH} + 10^{\frac{3}{10}} \times M_{PSCCH}\right) + P_{O\_PSSCH,4} + \alpha_{PSSCH,4} \cdot PL\right\}$$

$$A = \min\left\{P_{CMAX}, 10\log_{10}\left(M_{PSSCH} + 10^{\frac{3}{10}} \times M_{PSCCH}\right) + P_{OPSSCH,4} + \alpha_{PSSCH,4} \cdot PL\right\} \quad [\text{Equation 3}]$$

In Equation 2, $P_{MAX\_CBR}$ denotes the value of maxTxpower based on the priority level of a PSSCH and a CBR range including a CBR measured in subframe n−4.

Details of the PSSCH transmission power in sidelink transmission modes 1 to 3 may be found in 3GPP TS 36.213.

Embodiments

Hereinafter, a method of adjusting a transmission power when a sidelink signal is transmitted on a plurality of carriers will be described based on the above discussion. When V2X messages are transmitted on a plurality of carriers, the V2X messages may be overlap fully or partially in the time domain. In this case, if the sum of transmission powers of the V2X messages respectively transmitted on the plurality of carriers exceeds the maximum transmission power of a UE (dBm) (hereinafter such a case is referred to as a power-limited case) (for example, when a UE transmit V2X messages on three carriers at the same time and the power required for packet transmission on each carrier is X, Y, and Z, the sum of X, Y, and Z is more than the maximum transmission power of the UE, K (i.e., X+Y+Z>K)), transmission powers on at least some of the carriers may need to be adjusted/controlled. Various embodiments will be described in relation thereto. The priority described herein may be interpreted as at least one of a ProSe per-packet priority (PPPP), a carrier priority, and a service priority.

Figure 10:
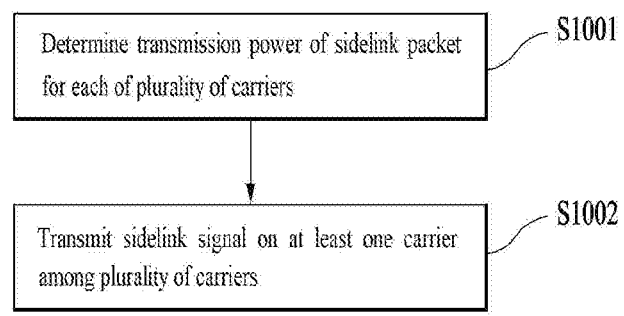
FIG. 10 is a flowchart for explaining an embodiment of the present disclosure.

Referring to FIG. 10, a UE may determine a transmission power of a sidelink packet for each of a plurality of carriers (S1001) and then transmit a sidelink signal on at least one carrier among the plurality of carriers based on the determined transmission power (S1002). In this case, at least some (part or all) of the transmission resources of sidelink packets scheduled to be respectively transmitted on the plurality of carriers may overlap in the time domain. The transmission power may be determined based on priorities of the sidelink packets scheduled to be respectively transmitted on the plurality of carriers, the sum of transmission powers of the sidelink packets scheduled to be respectively transmitted on the plurality of carriers, and the maximum transmission power of the UE.

As one transmission power adjustment method, the powers of the remaining packets except a packet with the highest priority (or a packet with a priority higher or equal to a predetermined or signaled threshold) may be reduced until the UE breaks away from the power-limited case.

For example, when the sum of the transmission powers of the sidelink packets scheduled to be respectively transmitted on the plurality of carriers exceeds the maximum transmission power, first transmission power adjustment may be performed. The first transmission power adjustment may reduce the transmission powers of the packets except the packet with the highest priority among the sidelink packets scheduled to be respectively transmitted on the plurality of carriers. The first transmission power adjustment may be performed until the sum of the transmission powers of the sidelink packets scheduled to be respectively transmitted on the plurality of carriers becomes less than or equal to the maximum transmission power. In this case, the transmission powers of the remaining packets except the packet with the highest priority may be adjusted according to the following two methods.

First, the transmission powers of the packets except the packet with the highest priority may be reduced at the same rate or at different rates. For example, when the priorities of packets respectively transmitted on carrier 1, carrier 2, and carrier 3 are determined in the following order: carriers 1, carrier 2, and carrier 3 (the powers required for packet transmission are X, Y, and Z), the transmission power (X) of the packet with the highest priority (or the packet with the priority higher or equal to the predetermined or signaled threshold) may be maintained, but the transmission powers of carrier 2 and carrier 3 may be reduced at the same scale (a=b) or at different scales (which are signaled or predetermined) such that Y and Z become aY and bZ (where 0<a<1 and 0<b<1) until the condition of X+aY+bZ≤K is satisfied. The application of the above method may be interpreted to mean that the transmission power of the packet of the highest priority (or the packet with the priority higher or equal to the predetermined or signaled threshold) is maintained (at most).

Second, the transmission powers of the packets except the packet with the highest priority may be reduced sequentially from a packet with the lowest priority. In other words, the transmission powers of the remaining packets except the packet with the highest priority (or the packet with the priority higher or equal to the predetermined or signaled threshold) may be reduced sequentially from the packet with the lowest priority (that is, in ascending order of priority) until the UE breaks away from the power limited-case.

In the above description, the adjustment of the powers (e.g., Y and Z) of the remaining packets except the packet with the highest priority (or the packet with the priority higher or equal to the predetermined or signaled threshold) may depend on UE implementation.

When the sum of the transmission powers of the sidelink packets scheduled to be respectively transmitted on the plurality of carriers is more than the maximum transmission power after the transmission powers of the packets except the packet with the highest priority are reduced to zero, second transmission power adjustment for reducing the transmission powers of all packets may be performed. The transmission powers of all packets may be reduced at the same rate or at different rates. In other words, when the UE fails to break away from the power-limited case due to the sum of the transmission powers of packets with priorities higher than or equal to the predetermined or signaled threshold even though the powers of the remaining packets except the packet with the highest priority (or the packet with the priority higher or equal to the predetermined or signaled threshold) are reduced to zero, the transmission powers of the corresponding packets may be reduced at the same scale or at the different scales (which are signaled or predetermined) until the UE breaks from away from the power-limited case. Alternatively, the transmission powers of the corresponding packets may be reduced sequentially from the packet with the lowest priority (that is, in ascending order of priority) until the UE breaks away from the power limited-case.

As another method, when the sum of the transmission powers of the sidelink packets scheduled to be respectively transmitted on the plurality of carriers exceeds the maximum transmission power, third transmission power adjustment may be performed. The third transmission power adjustment may reduce the transmission power of the packet with the lowest priority among the sidelink packets scheduled to be respectively transmitted on the plurality of carriers until the sum of the transmission powers of the sidelink packets scheduled to be respectively transmitted on the plurality of carriers becomes less than or equal to the maximum transmission power. In other words, the power adjustment may be performed sequentially from the packet with the lowest priority (that is, in ascending order of priority). If the UE breaks away from the power limited-case, the power adjustment is performed no longer. For example, when the priorities of packets respectively transmitted on carrier 1, carrier 2, and carrier 3 are determined in the following order: carriers 1, carrier 2, and carrier 3 (the powers required for packet transmission are X, Y, and Z), powers X and Y may be maintained, but the transmission power for packet transmission on carrier 3, Z may be reduced to Z' until the condition of X+Y+Z'≤K is satisfied. When Z becomes zero, if the condition of X+Y≤K is not satisfied, the transmission power for packet transmission on carrier 2, Y may be reduced to Y' until the condition of X+Y'≤K is satisfied.

The present disclosure is not limited to D2D communication. That is, the disclosure may be applied to UL or DL communication, and in this case, the proposed methods may be used by a BS, a relay node, etc.

Since each of the examples of the proposed methods may be included as one method for implementing the present disclosure, it is apparent that each example may be regarded as a proposed method. Although the proposed methods may be implemented independently, some of the proposed methods may be combined (or merged) for implementation. In addition, it may be regulated that information on whether the proposed methods are applied (or information on rules related to the proposed methods) should be transmitted from a BS to a UE or from a transmitting UE to a receiving UE through a predefined signal (e.g., a physical layer signal, a higher layer signal, etc.).

Device Configurations According to Embodiments of the Present Disclosure

Figure 11:
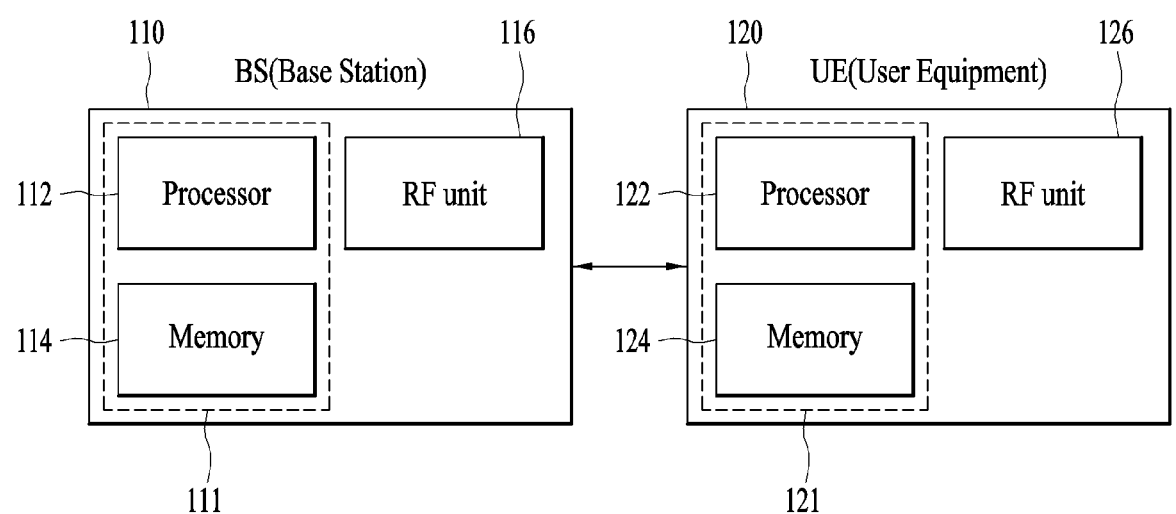
FIG. 11 is a block diagram illustrating devices according to the present disclosure.

Referring to FIG. 11, a wireless communication system includes a BS device 110 and a UE device 120. When the wireless communication system includes a relay, the BS or UE may be replaced with the relay.

The BS device 110 may include a processor 112, a memory 114, and a radio frequency (RF) unit 116. The processor 112 may be configured to perform the described/proposed procedures and methods by controlling the memory 114 and/or the RF unit 116. For example, the processor 112 may generate first information and/or a first signal by processing information in the memory 114 and then control the RF unit 116 to transmit a radio signal containing the first information/signal. The processor 112 may control the RF unit 116 to receive a radio signal containing second information and/or a second signal and then control the memory 114 to store information obtained by processing the second information/signal. The processor 112 may include a communication modem designed suitable for a wireless communication technology (e.g., LTE, NR, etc.). The memory 114 may be connected to the processor 112 and configured to store various information on the operations of the processor 112. For example, the memory 114 may store software code including commands for performing some or all of the processes controlled by the processor 112 or the described/proposed procedures and methods. The RF unit 116 may be connected to the processor 112 and configured to transmit and/or receive a radio signal. The RF unit 116 may include a transmitter and/or a receiver. The RF unit 116 may be replaced with a transceiver. The processor 112 and the memory 114 may be included in a processing chip 111 (e.g., system on chip (SOC)).

The UE device 120 may include a processor 122, a memory 124, and an RF unit 126. The processor 122 may be configured to perform the described/proposed procedures and methods by controlling the memory 124 and/or the RF unit 126. For example, the processor 122 may generate third information or a third signal by processing information in the memory 124 and then control the RF unit 126 to transmit a radio signal containing the third information/signal. The processor 122 may control the RF unit 126 to receive a radio signal containing fourth information or a fourth signal and then control the memory 124 to store information obtained by processing the fourth information/signal. For example, the processor 112 may be configured to determine the transmission power of a sidelink packet for each of a plurality of carriers and transmit a sidelink signal on at least one carrier among the plurality of carriers based on the determined transmission power. The transmission power may be determined based on priorities of sidelink packets scheduled to be respectively transmitted on the plurality of carriers, the sum of transmission powers of the sidelink packets scheduled to be respectively transmitted on the plurality of carriers, and the maximum transmission power of the UE.

The processor 122 may include a communication modem designed suitable for a wireless communication technology (e.g., LTE, NR, etc.). The memory 124 may be connected to the processor 122 and configured to store various information on the operations of the processor 122. For example, the memory 124 may store software code including commands for performing some or all of the processes controlled by the processor 122 or the described/proposed procedures and methods. The RF unit 126 may be connected to the processor 122 and configured to transmit and/or receive a radio signal. The RF unit 126 may include a transmitter and/or a receiver. The RF unit 126 may be replaced with a transceiver. The processor 122 and the memory 124 may be included in a processing chip 121 (e.g., SOC).

The above-described device may be replaced with a network node, a transmitting UE, a receiving UE, a wireless communication device, a vehicle, an autonomous driving vehicle, a drone (unmanned aerial vehicle (UAV)), an artificial intelligence (AI) module, a robot, an augmented reality (AR) device, a virtual reality (VR) device, etc. For example, the UE may include a mobile phone, a smartphone, a laptop computer, a digital broadcast terminal, a personal digital assistant (PDA), a portable multimedia player (PMP), a navigation device, a slate personal computer (PC), a tablet PC, an ultrabook, a wearable device (e.g., a smartwatch, a smart glass, a head mounted display (HMD), etc.), etc. For example, the drone may be a flying object controlled by radio control signals without a human pilot. For example, the HMD may be a display device worn on the head of a user. The HMD may be used to realize VR or AR.

The device may be a (autonomous driving) device configured to communicate with a mobile terminal, a network, and an autonomous driving vehicle other than the device. The device may be a (autonomous driving) device configured to implement at least one advanced driver assistance system (ADAS) function based on a signal controlling the movement of the device. The device may be a (autonomous driving) device configured to switch the driving mode of the device from an autonomous driving mode to a manual driving mode and vice versa. The device may be a (autonomous driving) device configured to perform autonomous driving based on external object information. The external object information may include at least one of information about whether there is an object, information about the location of the object, information about the distance from the device to the object, information about the relative speed between the device and object.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure may be used for a UE, a BS, a relay, or other equipment in a wireless mobile communication system.

The invention claimed is:

1. A method of transmitting a sidelink signal by a user equipment (UE) in a wireless communication system, the method comprising:
   determining a transmission power of a sidelink packet for each of a plurality of carriers; and
   transmitting the sidelink signal on at least one carrier among the plurality of carriers based on determined transmission power,
   wherein the transmission power is determined based on priorities of sidelink packets scheduled to be respectively transmitted on the plurality of carriers, a sum of transmission powers of the sidelink packets scheduled to be respectively transmitted on the plurality of carriers, and a maximum transmission power of the UE.

2. The method of claim 1, wherein transmission resources of the sidelink packets scheduled to be respectively transmitted on the plurality of carriers overlap at least partially in a time domain.

3. The method of claim 2, wherein based on that the sum of the transmission powers of the sidelink packets scheduled to be respectively transmitted on the plurality of carriers exceeds the maximum transmission power, first transmission power adjustment is performed, and wherein the first transmission power adjustment reduces transmission powers of packets except a packet with a highest priority among the sidelink packets scheduled to be respectively transmitted on the plurality of carriers.

4. The method of claim 3, wherein the transmission powers of the packets except the packet with the highest priority are reduced at a same rate or at different rates.

5. The method of claim 3, wherein the transmission powers of the packets except the packet with the highest priority are reduced sequentially from a packet with a lowest priority.

6. The method of claim 3, wherein the first transmission power adjustment is performed until the sum of the transmission powers of the sidelink packets scheduled to be respectively transmitted on the plurality of carriers after the transmission power adjustment becomes less than or equal to the maximum transmission power.

7. The method of claim 3, wherein based on that the sum of the transmission powers of the sidelink packets scheduled to be respectively transmitted on the plurality of carriers is more than the maximum transmission power after the transmission powers of the packets except the packet with the highest priority are reduced to zero, second transmission power adjustment for reducing transmission powers of all packets is performed.

8. The method of claim 7, wherein the transmission powers of all packets are reduced at a same rate or at different rates.

9. The method of claim 2, wherein based on that the sum of the transmission powers of the sidelink packets scheduled to be respectively transmitted on the plurality of carriers exceeds the maximum transmission power, third transmission power adjustment is performed, and wherein the third transmission power adjustment reduces a transmission power of a packet with a lowest priority among the sidelink packets scheduled to be respectively transmitted on the plurality of carriers until the sum of the transmission powers of the sidelink packets scheduled to be respectively transmitted on the plurality of carriers becomes less than or equal to the maximum transmission power.

10. The method of claim 9, wherein the third transmission power adjustment is sequentially performed from the packet with the lowest priority until the sum of the transmission powers of the sidelink packets scheduled to be respectively transmitted on the plurality of carriers becomes less than or equal to the maximum transmission power is performed.

11. An apparatus for transmitting a sidelink signal in a wireless communication system, the apparatus comprising:
a memory; and
a processor coupled to the memory,
wherein the processor is configured to determine a transmission power of a sidelink packet for each of a plurality of carriers and transmit the sidelink signal on at least one carrier among the plurality of carriers based on determined transmission power, and
wherein the transmission power is determined based on priorities of sidelink packets scheduled to be respectively transmitted on the plurality of carriers, a sum of transmission powers of the sidelink packets scheduled to be respectively transmitted on the plurality of carriers, and a maximum transmission power of the apparatus.

12. The apparatus of claim 11, wherein transmission resources of the sidelink packets scheduled to be respectively transmitted on the plurality of carriers overlap in a time domain.

13. The apparatus of claim 11, wherein the apparatus communicates with at least one of a mobile terminal, a network, or an autonomous driving vehicle other than the apparatus.

14. The UE of claim 11, wherein the apparatus is communicating with at least one of a UE, or a UE related to an autonomous driving vehicle, a base station or a network.

* * * * *